S. O'BRIEN.
CONNECTING SMOKE, HOT AIR, AND OTHER FLUES.
No. 253,416. Patented Feb. 7, 1882.
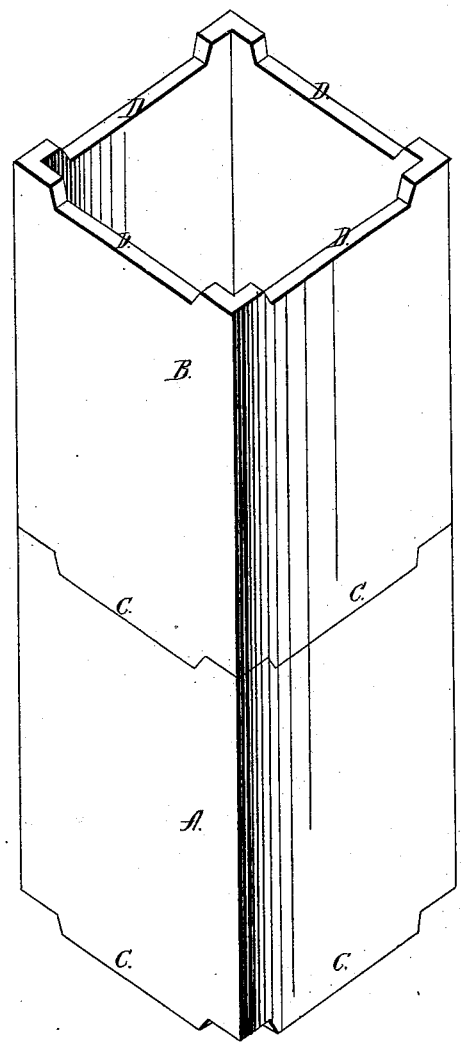
Attest:
W. G. Bell
M. B. Robb
Inventor:
Simpson O'Brien

UNITED STATES PATENT OFFICE.

SIMPSON O'BRIEN, OF NEW CUMBERLAND, WEST VIRGINIA, ASSIGNOR TO FREEMAN BROTHERS, OF McCOY'S, OHIO.

CONNECTING SMOKE, HOT-AIR, AND OTHER FLUES.

SPECIFICATION forming part of Letters Patent No. 253,416, dated February 7, 1882.

Application filed August 11, 1876.

*To all whom it may concern:*

Be it known that I, SIMPSON O'BRIEN, of New Cumberland, Hancock county, State of West Virginia, have invented an Improvement in Connecting Smoke, Hot-Air, and other Flues, made of cement or terra-cotta; and I do hereby declare that the following is a full and exact description thereof, reference being had to the accompanying drawing, and to the letters of reference marked therein.

My invention relates to the construction of terra-cotta linings for flues and like sectional pipes and conductors. These flue-linings are generally square or rectangular in cross-section, and are built into the wall for conducting smoke or hot air, or for ventilating purposes. Their meeting edges have generally been formed flat or straight, each section resting on the one below, and no means being provided in the pipes or linings themselves for holding them in proper relative position to each other. The linings were consequently liable to slip on each other or be shoved out of place in building, making an imperfect joint, which would reduce the size of the flue, cause it to smoke, and in some cases permit the escape of the flame and cause fire. Two different means of connecting these flue-linings to overcome these objections have been employed, one of these having bowls or sockets formed at one end of the pipe, in which the other end of the connecting-section fitted. These pipes, while overcoming the objections above stated, interfered with the proper building of the pipe into the wall, as they increased its diameter at the joints or connections. In the other the pipes were connected by means of bevel-edge joints, the inner surface of one joint or section being beveled to receive a correspondingly-beveled annular projection on the next section, thus making a smooth external and internal joint. These pipes were, however, difficult to make, as they were liable to be distorted in drying or baking, and the thinned edges of the joining ends would break easily in handling or transportation, and for these reasons their use has been quite limited.

The object of my invention is to obviate these difficulties in forming a joint for flue-linings and like pipe; and it consists in forming the sections of the pipe with projections and recesses adapted to interlock with one another, two or more of the different projections or recesses on the end of the pipe being set at an angle each to the other, so as to lock the sections against lateral displacement when connected together.

To enable others skilled in the art to make and use my invention, I will describe its construction and manner of use.

In the drawing my improved flue-lining is illustrated by a perspective view, showing two sections when connected together.

A represents the lower section, the upper section, B, resting upon it and connected by my improved joint. Each section is provided with the projections or tongues C at one end, these projections being formed of the same thickness as the walls of the pipe and formed as extensions of the walls. The different projections or tenons are set at an angle to each other, one being generally formed extending from each side of the pipe, where it is angular. At the other or reverse end of the pipe are formed corresponding recesses or grooves, D, which extend into the walls at the end, and correspond in form and position to the projections or tongues on the other end, so that when the two sections are placed together the recesses D will fit over the projections C and form a joint, which is smooth on both the exterior and interior of the pipe, and which neither reduces the flue-space nor increases the diameter of the pipe, so as to occupy more space in building. As the several projections and recesses on the ends of the pipe are set at an angle to one another, it is evident that they securely lock the sections against lateral displacement, as the connection between one projection and depression prevents the only lateral movement of which the like connection set at an angle to it is capable, and therefore a sure and reliable joint is obtained. The different sections are connected by simply putting one on top of the other.

The flue-lining shown is rectangular, and has the projections and recesses formed on or in all four sides, and the projections formed at one end, while the recesses are formed at the other; and this is the construction I prefer, as the pipe can then be stood on end for drying and baking, which could not be done if they were not regular, and each section is formed alike and adapted to fit in its proper place. It is evident, however, that if but two projections or depressions so set at an angle on each section and interlocked, as above described, were employed, the pipe would be locked against lateral displacement. As the projections are formed the same thickness as the pipe-walls, the pipes are not so liable to be distorted in drying or baking as where the walls of the joint are thinned or beveled, and as they are thick, there is little or no liability of breakage. I thus obtain a joint for flue-lining and other pipes which is not subject to lateral displacement, is of uniform external and internal diameter, has no enlargement at the joints, and where made of clay is not so liable to become distorted in manufacture or to breakage in transportation.

I am aware that pipes cylindrical in cross-section have been formed with a pair of corresponding tongues and grooves or recesses set one diametrically opposite the other, and therefore that the broad idea of joining sections of pipes by having their ends constructed irregularly or with projections and recesses is not new, and therefore I do not claim the same; but in those pipes the edges of the tongues and ends of the grooves were beveled, in order to prevent the lateral displacement of the sections, and such bevels leave acute angles, liable to be broken off, thus permitting the lateral displacement of the pipe in one direction, and so rendering it more or less imperfect and useless.

The essential feature of construction whereby I obtain the desired result and avoid the objectionable feature of the above-recited construction is the arrangement of one set of projections and recesses at an angle to the other or others, so that one serves to lock the other or others. The locking-surfaces may be flat or straight, and the liability of the lateral displacement of the sections is obviated without dovetailing the parts or forming acute and easily-broken angles thereon.

What I claim as my invention, and desire to secure by Letters Patent, is—

A pipe-section having projections or recesses on the end thereof set at an angle to one another, so as to lock against lateral displacement when the section is joined with its counterpart, substantially as set forth.

SIMPSON O'BRIEN.

Witnesses:
EPHRAIM ATKINSON,
W. G. BELL.